United States Patent
Nagayama et al.

(10) Patent No.: US 11,519,823 B2
(45) Date of Patent: Dec. 6, 2022

(54) VEHICLE TESTING DEVICE WITH ADJUSTABLE, SIDE COOLING DEVICE

(71) Applicant: HORIBA, LTD., Kyoto (JP)

(72) Inventors: Takashi Nagayama, Kyoto (JP); Kaori Adachi, Kyoto (JP); Dongkai Zhang, Kyoto (JP)

(73) Assignee: HORIBA, LTD., Kyoto (JP)

( * ) Notice: Subject to any disclaimer, the term of this patent is extended or adjusted under 35 U.S.C. 154(b) by 80 days.

(21) Appl. No.: 17/059,396

(22) PCT Filed: Jul. 16, 2019

(86) PCT No.: PCT/JP2019/027860
§ 371 (c)(1),
(2) Date: Nov. 27, 2020

(87) PCT Pub. No.: WO2020/017485
PCT Pub. Date: Jan. 23, 2020

(65) Prior Publication Data
US 2021/0239572 A1    Aug. 5, 2021

(30) Foreign Application Priority Data

Jul. 18, 2018    (JP) .............................. JP2018-135371

(51) Int. Cl.
*G01M 17/007*    (2006.01)
*G01L 5/28*    (2006.01)

(52) U.S. Cl.
CPC ......... *G01M 17/0072* (2013.01); *G01L 5/282* (2013.01)

(58) Field of Classification Search
CPC .......... G01M 17/0072; G01M 17/0074; G01L 5/282
See application file for complete search history.

(56) References Cited

U.S. PATENT DOCUMENTS

| | | |
|---|---|---|
| 2012/0067475 A1 | 3/2012 | Hino |
| 2016/0061692 A1 | 3/2016 | Horejsi et al. |

FOREIGN PATENT DOCUMENTS

| | | |
|---|---|---|
| EP | 1338881 A1 | 8/2003 |
| JP | 06-043940 B | 6/1994 |
| JP | 3109396 B | 11/2000 |
| JP | 2001-289741 A | 10/2001 |

(Continued)

OTHER PUBLICATIONS

Newswheel (https://thenewswheel.com/new-gm-brake-testing-facility-creates-sounds-silence/, 2014) (Year: 2014).*

(Continued)

*Primary Examiner* — Eric S. McCall
*Assistant Examiner* — Timothy P Graves
(74) *Attorney, Agent, or Firm* — Brooks Kushman P.C.

(57) ABSTRACT

A vehicle testing device including a cooling device, which is capable of freely selecting a part to be cooled and a wind direction in accordance with a purpose of a test is provided. The vehicle testing device that tests a test piece that is a vehicle or a part of the vehicle includes a rotating body on which the test piece is placed, and a cooling device that sends air from a side of the test piece to at least a part of the test piece in order to cool the test piece placed on the rotating body.

11 Claims, 7 Drawing Sheets

(56) References Cited

FOREIGN PATENT DOCUMENTS

| JP | 2009-133631 A | 6/2009 | | |
|---|---|---|---|---|
| JP | 2016-001173 A | 1/2016 | | |
| KR | 20010093931 A | * | 10/2001 | ............ G01M 17/00 |
| WO | 2010-143644 A1 | 12/2010 | | |
| WO | 2015-178362 A1 | 11/2015 | | |
| WO | WO-2015178362 A1 | * | 11/2015 | .......... G01M 17/007 |

OTHER PUBLICATIONS

Link engineering Model 4900 NVH Chassis Dynamometer; https://www.linkeng.com/product/model-4900-nvh-chassis-dynamometer/ (Year: 2022).*
"New GM Brake Testing Facility Creates the Sounds of Silence", Jul. 3, 2014, retrieval date Oct. 1, 2019, internet<URL:https://thenewswheel.com/new-gm-brake-testing-facility-creates-sounds-silence/>, 5 pgs.
International Search Report dated Oct. 15, 2019 issued for International Application No. PCT/JP2019/027860, 4 pgs.
EESR dated Apr. 7, 2022 issued in EP patent application No. 19838685.6, 12 pgs.

* cited by examiner

VEHICLE TESTING DEVICE WITH ADJUSTABLE, SIDE COOLING DEVICE

CROSS-REFERENCE TO RELATED APPLICATIONS

This application is the U.S. national phase of PCT Application No. PCT/JP2019/027860, filed Jul. 16, 2019, which claims priority to Japanese Patent. Application No. 2018-135371, filed Jul. 18, 2018, which are both incorporated by reference herein in their entireties.

TECHNICAL FIELD

The present invention relates to a vehicle testing device used to carry out a simulated running test or the like of a test vehicle.

BACKGROUND ART

Hitherto, as described in, for example, PTL 1 or PTL 2, a vehicle testing device including a cooling device that sends air from an air outlet at a floor ahead of a roller to a tire-wheel assembly of a test vehicle that is a test piece placed on the roller has been known.

CITATION LIST

Patent Literature

PTL 1: Japanese Unexamined Patent Application Publication No. 2016-001173
PTL 2: Japanese Unexamined Patent Application Publication No. 2001-289741

SUMMARY OF INVENTION

Technical Problem

For a vehicle testing device as described above, there is a request to not only merely cool a tire-wheel assembly but also, in accordance with the purpose of a test, cool a portion, such as a brake installed in the tire-wheel assembly, where air is not directly blown from an air outlet at a floor ahead of a test piece. There is also a request to improve cooling efficiency as compared to before.

However, in the existing vehicle testing device, the air outlet of the cooling device is fixed at the floor ahead of the roller, so that it is difficult to meet such requests.

For this reason, it is an object of the present invention to provide a vehicle testing device including a cooling device, which is capable of freely selecting a part to be cooled in accordance with the purpose of a test and which is capable of improving cooling efficiency as compared to before.

Solution to Problem

More specifically, a vehicle testing device according to the present invention is a vehicle testing device that tests a test piece that is a vehicle or a part of the vehicle and includes a rotating body on which the test piece is placed, and a cooling device that sends air from a side of the test piece toward at least a part of the test piece in order to cool the test piece placed on the rotating body.

With the above vehicle testing device, it is possible to blow air from the side of the test piece, so that it is possible to send direct air also to a side surface of a tire, a wheel, a brake pad, a brake disk, or the like, to which air has not been able to be directly blown.

In addition, air is blown from the side of a tire-wheel assembly of the test piece to a wheel accommodation space accommodating the tire-wheel assembly, so that it is possible to agitate air in the wheel accommodation space.

Air in the wheel accommodation space has a greater contact area with the tire-wheel assembly than air directly sent to the tire-wheel assembly, so that, when the air in the wheel accommodation space is agitated to be cooled, it is possible to more efficiently cool the entire tire-wheel assembly than before.

In the specification, a direction of travel of the test piece is defined as front and rear, and an outside beyond right and left side surfaces of the test piece while facing in a direction of forward travel of the test piece is defined as side. More specifically, an outer side with respect to an imaginary straight line passing through an outermost end in an axial direction of the rotating body (specifically, an outer peripheral surface on which the test piece is placed) and perpendicular to an axis of the rotating body is defined as side.

The tire-wheel assembly in the specification is the one including a wheel and a tire.

When the cooling device includes an air outlet that sends air from the side of the test piece toward at least a part of the test piece, and a wind direction adjuster that adjusts a position or an orientation of the air outlet, it is possible to freely select a part of the test piece to be cooled and a wind direction in accordance with a purpose of a test.

In addition, it is possible to send air at a specific part intended to be cooled, so that it is possible to further improve cooling efficiency for a part to be cooled.

When the wind direction adjuster is configured to be movable in a front-rear direction of the test piece or the side of the test piece, it is possible to further improve the flexibility of a part to be cooled.

When a vehicle fixing part disposed on the side of the rotating body so as to extend in a front-rear direction of the test piece and used to fix the test piece on the rotating body is further provided, and the wind direction adjuster is fixed to the vehicle fixing part, it is possible to use the vehicle fixing part originally provided for the vehicle testing device, so that the configuration of the vehicle testing device can be further simple.

As a specific embodiment of the present invention, the wind direction adjuster may be fixed to the vehicle fixing part such that the position of the air outlet is movable relative to the test piece along a direction in which the vehicle fixing part extends.

The wind direction adjuster may adjust the position or the orientation of the air outlet such that air is sent toward a tire-wheel assembly of the test piece or a wheel accommodation space accommodating the tire-wheel assembly of the test piece.

When the wind direction adjuster causes the air outlet to be turnable forward and rearward of the test piece, it is possible to improve the flexibility of wind direction.

When the vehicle testing device further includes an air volume controller that controls a volume of air sent from the air outlet, it is possible to appropriately cool the tire-wheel assembly and the like of the test piece.

Specifically, the air volume controller may control the volume of air in accordance with a vehicle speed of the test piece, a rotational speed of the rotating body, or a temperature of the tire-wheel assembly.

It is conceivable that a temperature of a brake is likely to increase when a deceleration of a vehicle speed of the test piece or a deceleration of a rotational speed of the rotating body is large, so that, when, for example, the brake is intended to be cooled, the air volume controller may control the volume of air in accordance with a deceleration of a vehicle speed of the test piece or a deceleration of a rotational speed of the rotating body.

Furthermore, when the deceleration is greater than or equal to a predetermined threshold, the air volume controller may control the volume of air such that the volume of air increases.

Advantageous Effects of Invention

According to the present invention, it is possible to freely select a part of a test piece to be cooled and a wind direction in accordance with a purpose of a test, and it is also possible to improve cooling efficiency for parts to be cooled as compared to before.

REFERENCE SIGNS LIST

Figure 1:
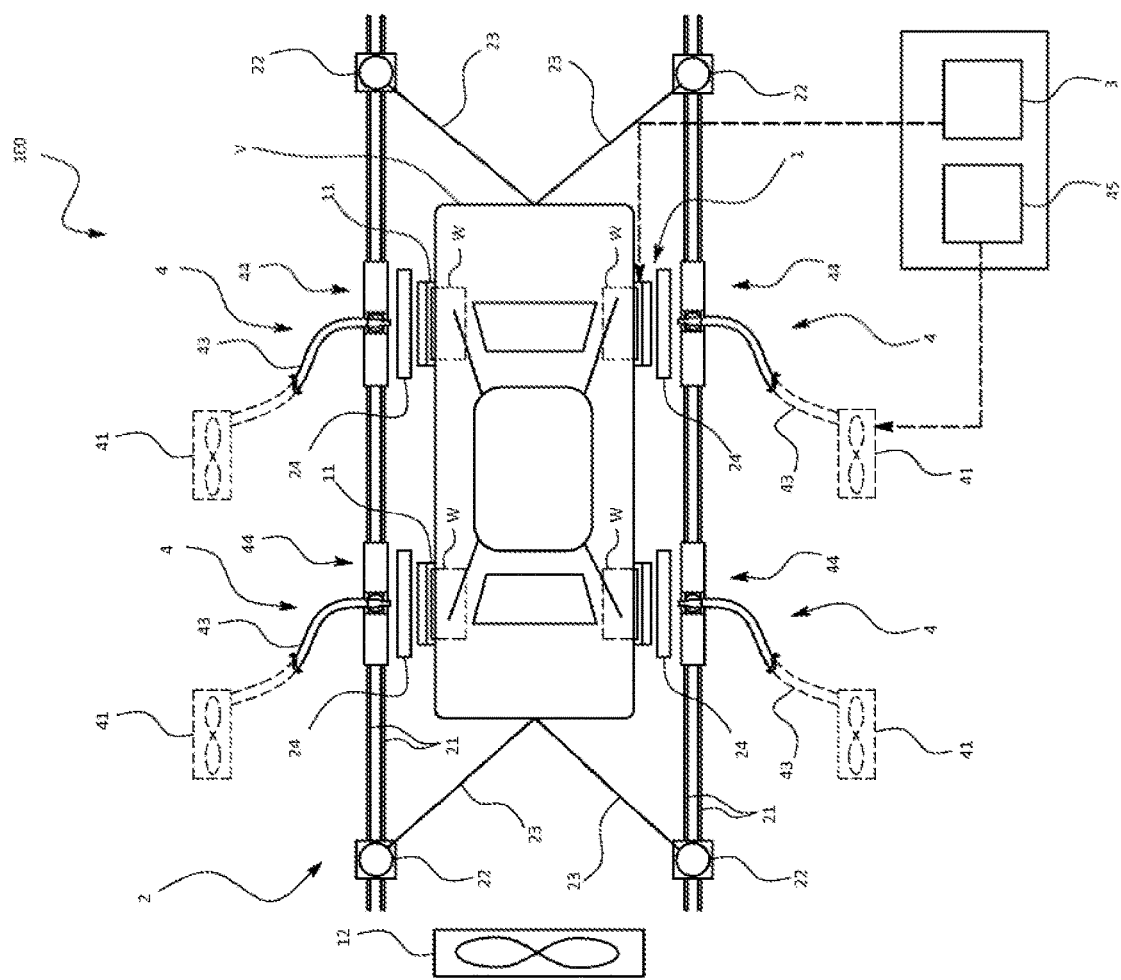
FIG. 1 is an overall schematic diagram of a vehicle testing device according to an embodiment of the present invention.

V test vehicle
W tire-wheel assembly
W4 wheel accommodation space
100 vehicle testing device
1 dynamometer
11 roller
42 air outlet
44 wind direction adjuster
45 air volume controller

DESCRIPTION OF EMBODIMENTS

Hereinafter, a vehicle testing device 100 according to an embodiment of the present invention will be described with reference to the drawings.

Figure 2:
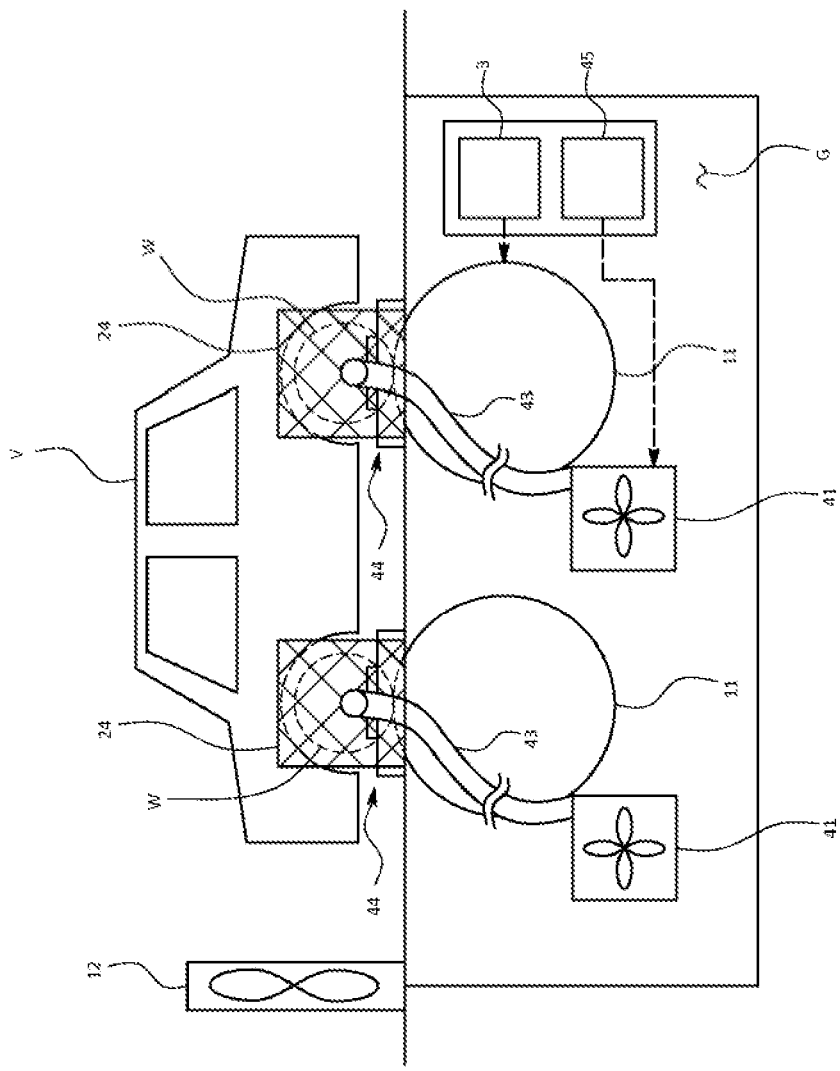
FIG. 2 is an overall schematic diagram of the vehicle testing device according to the present embodiment.

As illustrated in FIG. 1 and FIG. 2, a chassis dynamo device that is the vehicle testing device 100 according to the present embodiment includes, for example, a chassis dynamometer 1 on which a test vehicle that is a test piece is mounted, a vehicle fixing part 2 that fixes the test vehicle V to the chassis dynamometer, and a dynamo controller 3 that controls the chassis dynamometer 1.

The chassis dynamometer 1 functions as, for example, a load device that applies load to the test vehicle V in accordance with a driving state in mode running or actual road running.

Specifically, the chassis dynamometer 1 includes, for example, rollers 11 that are rotating bodies on which drive wheels, such as front wheels, of tire-wheel assemblies W of the test vehicle V are placed, a power absorber connected to the rollers 11, and a large fart 12 disposed ahead of the test vehicle V.

The rotating bodies are, for example, cylindrical rollers 11, endless belts, or the like configured to rotate in a front-rear direction of the test vehicle V.

The vehicle fixing part 2 includes, for example, rails 21 extending in the front-rear direction of the test vehicle V, poles 22 installed so as to be movable along the rails 21, wires 23 that connect the poles 22 to the test vehicle V, and the like.

The rails 21 are, for example, disposed on both sides of the test vehicle V so as to be parallel to the front-rear direction of the test vehicle V.

The dynamo controller 3 is configured such that an information processing circuit including, for example, a CPU, memory, an A/D converter, a D/A converter, and the like causes the CPU and peripheral devices to cooperate in accordance with a program stored in a predetermined area of the memory to exercise the function.

The dynamo controller 3 controls the torque of the power absorber such that a target running resistance determined in a predetermined running mode is attained.

Thus, the chassis dynamo device 100 according to the present embodiment further includes cooling devices 4 that cool drive wheels and non-drive wheels that are the tire-wheel assemblies W of the test vehicle V, brakes B installed in these tire-wheel assemblies W, or the like with air.

Each cooling device 4 includes a fan 41 for generating air flow, a blower tube 43 of which one end is connected to the fan 41 and the other end has an air outlet 42, a wind direction adjuster 44 that adjusts a position and/or an orientation of the air outlet 42 relative to the test vehicle V, and an air volume controller 45 that control the volume of air.

The number of the cooling devices 4 provided is equal to the number of the tire-wheel assemblies W of the test vehicle V placed on the chassis dynamo device 100.

The fan 41 is disposed in, for example, an underground pit G of the chassis dynamo device 100 or outside the rail 21.

The blower tube 43 is a flexible hose that connects the fan 41 and the air outlet 42.

In this embodiment, a distal end portion of the blower tube 43 where the air outlet 42 is formed is made up of a nozzle member, and is disposed on the side of the roller 11 outside a guard fence 24 provided outside the tire-wheel assembly so that air is sent to the side of the tire-wheel assembly W from outside the guard fence 24. The air outlet 42 has a circular shape with a diameter of about 5 cm.

The wind direction adjuster 44 adjusts the position and/or the orientation of the air outlet 42 by changing the position and/or the orientation of the distal end portion of the blower tube 43 attached to the wind direction adjuster 44.

Figure 3:
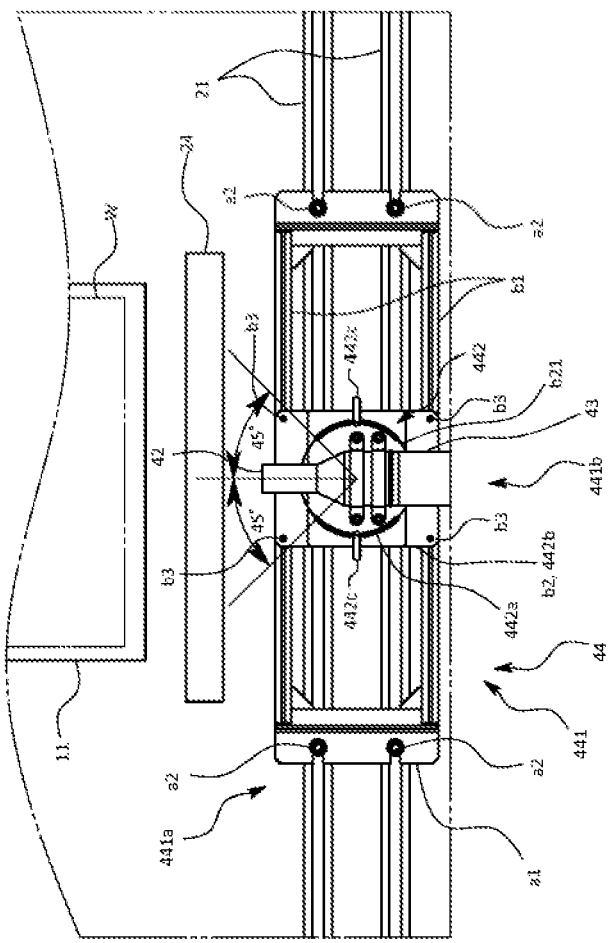
FIG. 3 is a schematic diagram illustrating the structure of a wind direction adjuster according to the present embodiment.

As illustrated in FIG. 3, the wind direction adjuster 44 includes a position adjustment mechanism 441 that adjusts the position of the distal end portion in the front-rear direction of the test vehicle V and an orientation adjustment mechanism 442 that adjusts the orientation of the distal end portion in the front-rear direction of the test vehicle V.

In the present embodiment, the position adjustment mechanism 441 includes a first position adjustment mechanism 441*a* capable of roughly moving the position of the distal end portion and a second position adjustment mechanism 441*b* capable of minutely adjusting the position of the distal end portion.

The first position adjustment mechanism 441*a* is made up of the pair of rails 21 of the chassis dynamo device 100, and a movable base a1 slidable along the rails 21.

The movable base a1 is adjusted to a predetermined position and then fixed by a first fixing mechanism a2, such as a screw. In the drawings, the movable base a1 is illustrated as a rectangular frame member; however, the movable base a1 is not limited thereto.

The second position adjustment mechanism 441*b* includes a pair of rails b1 provided for the movable base a1, and a slide member b2 slidable on the rails b1 of the movable base a1.

The slide member b2 is adjusted to a predetermined position and then fixed by a second fixing mechanism b3, such as a screw. In the drawings, the slide member b2 is a rectangular plate having a smaller size in the front-rear direction of the test vehicle V than the movable base a1; however, the slide member b2 is not limited thereto.

In this embodiment, the second position adjustment mechanism 441*b* is provided so as to be interposed between the movable base a1 and the distal end portion attached to the movable base a1.

In this embodiment, the orientation adjustment mechanism 442 is provided so as to be further interposed between the slide member b2 and the distal end portion attached to the slide member b2.

The orientation adjustment mechanism 442 includes a turn member 442*a* to which the distal end portion is fixed, and a support member 442*b* that supports the turn member 442*a* such that the turn member 442*a* is able to turn.

In the present embodiment, the turn member 442*a* is, for example, a disk-shaped plate and is configured to be capable of turning 45° each, 90° in total, in forward and rearward directions of the test vehicle V by turning while its outer periphery is in contact with the inner periphery of the support member 442*b*.

The turn member 442*a* is fixed by, for example, an orientation fixing mechanism 442*c*, such as a crank lever.

In this embodiment, the support member 442*b* is the slide member b2, and the turn member 442*a* is accommodated in a recessed portion b21 formed on the surface of the slide member b2 such that the outer periphery of the turn member 442*a* comes in contact with the inner periphery of the recessed portion.

An example of a method of adjusting the position or the orientation of the air outlet 42 by the wind direction adjuster 44 will be described below.

The position of the air outlet 42 can be adjusted by changing the position, in the front-rear direction of the test vehicle V, of the movable base a1 or the slide member b2, to which the distal end portion of the blower tube 43 is attached.

The position of the movable base a1 is changed by moving the movable base a1 along the rails 21 after loosening the screw that is the first fixing mechanism a2 and then fixing the movable base a1 to the rails 21 at a desired position by fastening the screw that is the first fixing mechanism a2.

When the position of the movable base a1 is changed in this way, the positions of the second position adjustment mechanism 441*b* and the orientation adjustment mechanism 442, mounted on the movable base a1, are also changed accordingly.

The position of the slide member b2 is changed by loosening the screw that is the second fixing mechanism b3 that fixes the slide member b2 to the rails b1 provided for the movable base a1 and then sliding the slide member b2 in the front-rear direction of the test vehicle V on the rails b1 of the movable base a1. After the slide member b2 is moved to a desired position, the slide member b2 is fixed to the rails b1 of the movable base a1 by fastening the screw that is the second fixing mechanism b3.

When the position of the slide member b2 is changed in this way, the position of the orientation adjustment mechanism 442 mounted on the slide member b2 is also changed accordingly.

The orientation of the air outlet 42 can be adjusted by the degree of turn, in the front-rear direction of the test vehicle V, of the turn member 442*a* to which the distal end portion of the blower tube 43 is fixed.

In this embodiment, the degree of turn of the turn member 442*a* is changed by loosening the orientation fixing mechanism 442*c* that fixes the turn member 442*a* such that the turn member 442*a* does not turn relative to the slide member b2 and then tuning the turn member 442*a*. When the orientation of the air outlet 42 becomes a desired angle, the orientation fixing mechanism 442*c* is fastened to fix the turn member 442*a* such that the turn member 442*a* does not turn relative to the slide member b2.

In this way, by adjusting the position and/or the orientation of the air outlet 42, it is possible to send air from the air outlet 42 toward an intended location, for example, a tire W1 of the tire-wheel assembly W, a wheel W2 of the tire-wheel assembly W, the brake B (a brake pad B1 or a brake disk B2), a wheel accommodation space W4 (tire house) provided between a body of the test vehicle V and the tire-wheel assembly W.

Figure 4:
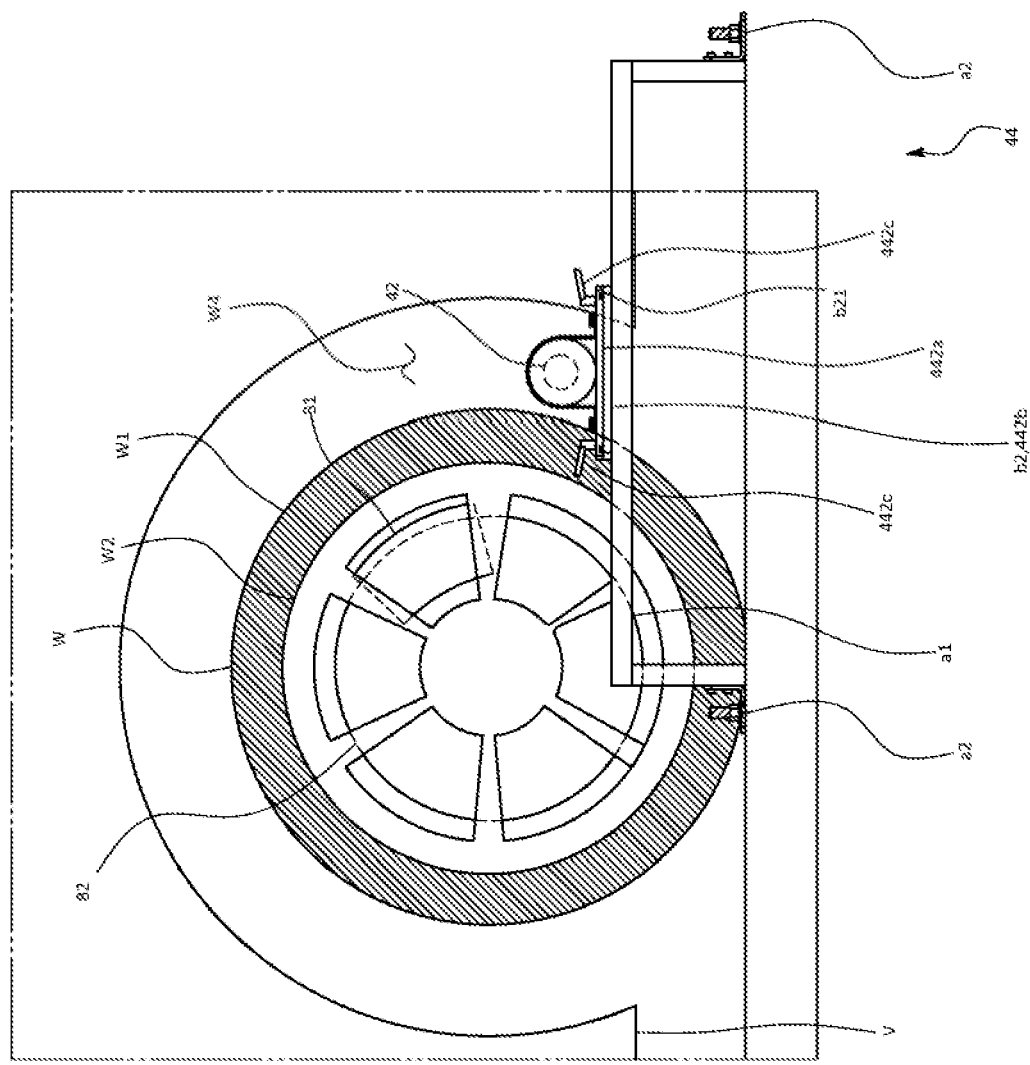
FIG. 4 is an example of a positional relationship between a part to be cooled and an air outlet according to the present embodiment.
Figure 5:
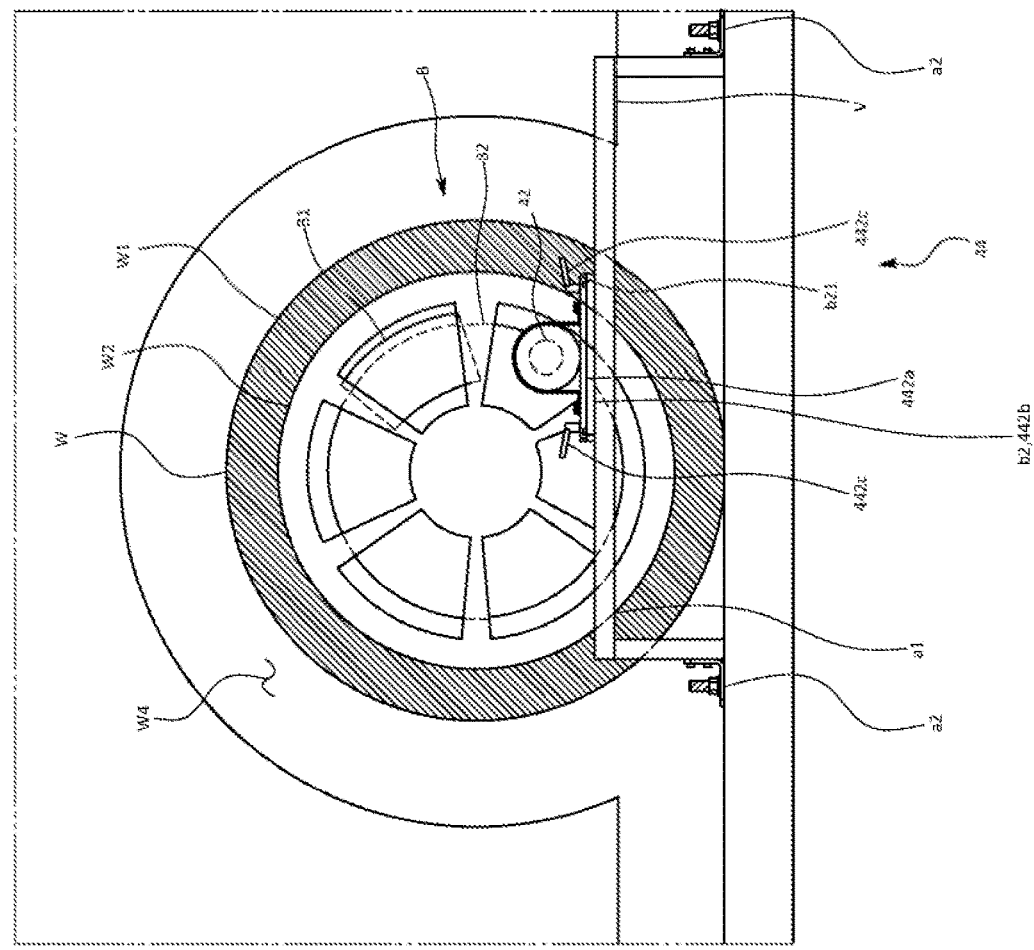
FIG. 5 is an exemplary change of a positional relationship between a part to be cooled and the air outlet according to the present embodiment.

FIG. 4 is a diagram illustrating an example of a positional relationship between a part to be cooled and the air outlet in the case where air is blown to the wheel accommodation space W4. FIG. 5 is a diagram illustrating an example of a positional relationship between a part to be cooled and the air outlet in the case where air is blown to the brake pad or the brake disk.

Figure 6:
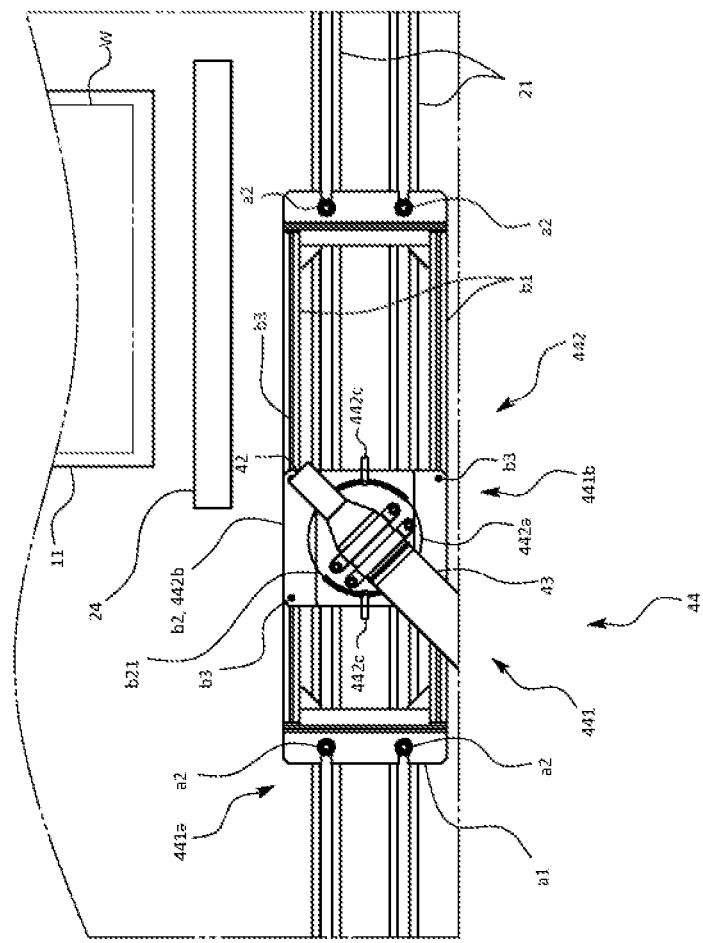
FIG. 6 is a modification of a position and/or an orientation of the air outlet according to the present embodiment.

For the position of the air outlet 42 in the front-rear direction of the test vehicle V, for example, as illustrated in FIG. 6, air can be sent from diagonally ahead of the test vehicle V by disposing the air outlet 42 on the front side of the test vehicle V with respect to the center of the tire-wheel assembly W that receives air from the air outlet 42.

The air volume controller 45 is the one that the information processing circuit exercises the function and controls a volume of air by, for example, controlling the number of revolutions of the fan 41.

Figure 7:
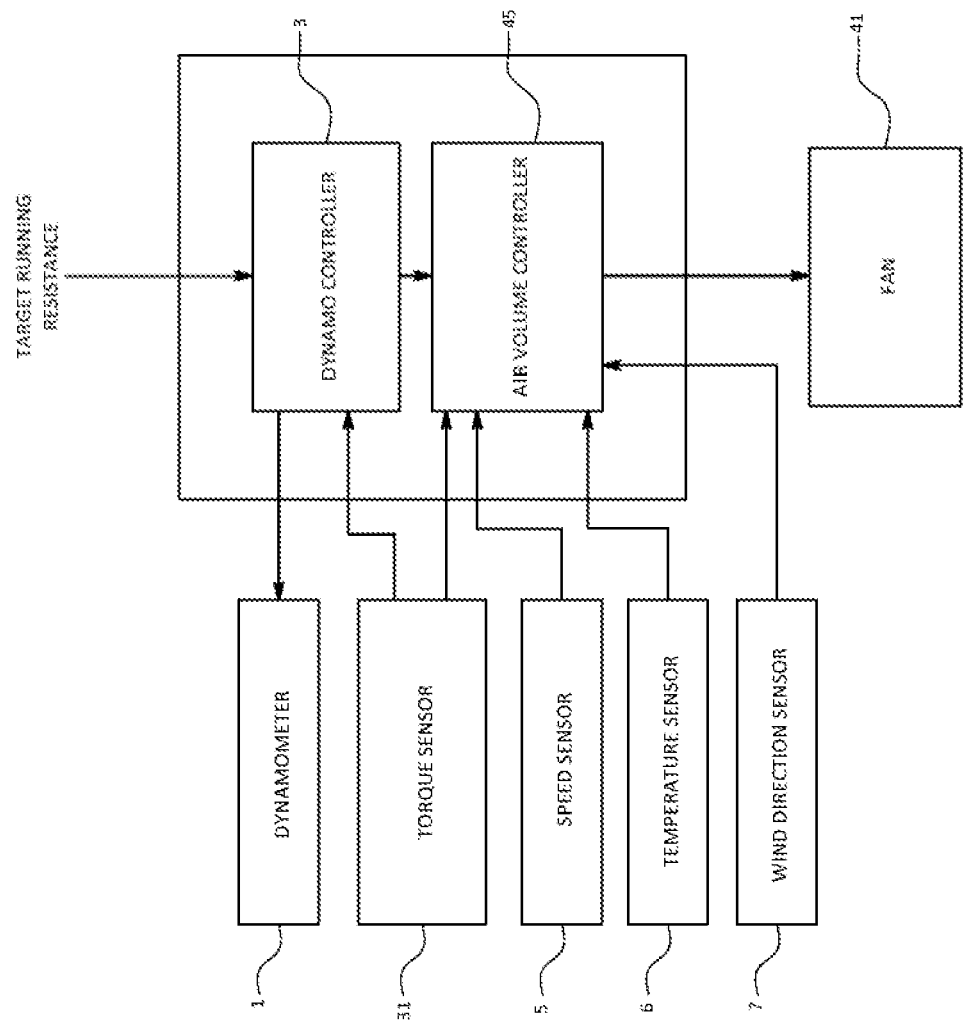
FIG. 7 is a control block diagram according to the present embodiment.

A method of controlling the volume of air by the air volume controller 45 will be described below with reference to FIG. 7.

The air volume controller 45 controls, for example, the number of revolutions of the fan 41 in accordance with, for example, a signal indicating a torque-related value or the like from the torque sensor 31 or the dynamo controller 3, or a signal from a detector, such as a speed sensor 5 that detects the vehicle speed of the test vehicle V or the rotational speed of the roller 11 and a temperature sensor 6 that detects a temperature or the like of the tire-wheel assembly W.

When the tire-wheel assembly W of the test vehicle V is cooled, it is conceivable that heat due to friction between the roller 11 and the tire-wheel assembly W is likely to be generated as the vehicle speed of the test vehicle V or the rotational speed of the roller 11 increases.

For this reason, when the air volume controller 45 controls the volume of air sent from the air outlet 42 in accordance with the vehicle speed of the test vehicle V or the rotational speed of the roller 11, it is possible to further appropriately cool the tire-wheel assembly W by preventing excessive cooling and insufficient cooling.

The air volume controller 45 controls the volume of air such that the volume of air increases as the vehicle speed of the test vehicle V or the rotational speed of the roller 11 increases, so that it is also possible to improve the reproducibility of load caused by air from the side in actual road running.

The air volume controller 45 may control the volume of air such that the volume of air increases as the temperature of the tire-wheel assembly W increases.

With this configuration, it is possible to further appropriately cool the tire-wheel assembly W by preventing excessive cooling and insufficient cooling of the tire-wheel assembly W.

Depending on test conditions, not only the tire-wheel assembly W but also the brake B installed in the tire-wheel assembly W may be intended to be cooled.

This is because, particularly, in the case of a continuous downhill, it is conceivable that large friction generated between the brake B and the tire-wheel assembly W continues for a long time and, therefore, excessive heat accumulates in the brake B.

In the invention of the subject application, air is blown from the side of the test vehicle V, so it is possible to blow air at the brake pad B1 or the brake disk B2, which is a component of the brake B. Therefore, it is possible to suppress excessive heat accumulated in the brake pad B1 or the brake disk B2.

In such a case, it is also conceivable that the air volume controller 45 controls the volume of air such that the volume of air is increased as the deceleration of the vehicle speed of the test piece or the deceleration of the rotational speed of the roller 11 increases.

When large friction is generated between the brake B and the tire-wheel assembly W, the brake B needs to be cooled; whereas, when friction is sufficiently small or when the vehicle speed of the test piece or the rotational speed of the roller 11 is decelerating not by the brake B but by engine braking or the like, the necessity to cool the brake B decreases.

Therefore, the air volume controller 45 obtains friction to such an extent that cooling is not needed or the deceleration of the vehicle speed of the test piece or the deceleration of the rotational speed of the roller 11, caused by the engine brake or the like, as a predetermined threshold in advance and, only when the deceleration becomes greater than or equal to the threshold, increases the volume of air. With this configuration, it is possible to further efficiently cool the brake B.

Incidentally, it is conceivable that, depending on the angle of the air outlet 42 relative to the front-rear direction of the test vehicle V, the way in which air blows against the tire-wheel assembly W, the wheel accommodation space W4, the brake B, or the like and the cooling efficiency change.

Therefore, the air volume controller 45 may control the volume of air in accordance with a signal from a wind direction sensor 7 that detects the angle of the air outlet 42 or air sent from the air outlet 42 relative to the front-rear direction of the test vehicle V.

With the thus configured chassis dynamo device 100, the following advantageous effects are obtained.

Air from the air outlet 42 is blown from the side of the tire-wheel assembly W against the tire-wheel assembly W or the wheel accommodation space W4, and furthermore the wind direction adjuster 44 that adjusts the position or the orientation of the air outlet 42 is provided, so it is possible to directly send air also to the side surface of the tire W1, the wheel W2, the brake pad B1, the brake disk B2, or the like, to which air has not been able to be directly blown before.

As a result, it is possible to freely select a part of the test vehicle V to be cooled and a wind direction in accordance with a purpose of a test.

Air from the air outlet 42 is blown from the side of the tire-wheel assembly W against the tire-wheel assembly W or the wheel accommodation space W4, so it is possible to circulate air in the wheel accommodation space W4, with the result that it is possible to efficiently cool the entire tire-wheel assembly W as compared to before.

It is conceivable that, on a road, there is the influence of not only wind from ahead but also wind from a side. Therefore, in a test that reproduces actual road running indoors, it is possible to reproduce wind from the side of the test vehicle V, so it is presumable that a test is possible under conditions further close to actual running conditions.

Since the shape of the distal end portion of the blower tube 43 is formed in a nozzle shape and the diameter of the air outlet 42 formed at the distal end portion is small and set to about 5 cm, it is possible to blow air against the test vehicle V at an wind velocity of about 200 km/h even when an especially large fan 41 is not prepared.

Since the movable base a1 of the wind direction adjuster 44 is installed on the rails 21 originally provided for the chassis dynamo device 100 and then the position of the air outlet 42 is adjusted, it is possible to change the position of the air outlet 42 in the front-rear direction of the test vehicle V with a simple configuration.

The rails 21 are sufficiently longer than the front-rear length of the test vehicle V, so it is possible to move the position of the air outlet 42 in the front-rear direction of the test vehicle V within a range wider than the front-rear length of the test vehicle V.

Specifically, it is possible to blow air from the air outlet 42 at the tire part W1 of the tire-wheel assembly W, the wheel part W2 of the tire-wheel assembly W, the brake pad B1 or the brake disk B2 installed in the tire-wheel assembly W, the wheel accommodation space W4 accommodating the tire-wheel assembly W, or the like. The angle of air blown against each part may also be freely adjusted.

Particularly, when air from the air outlet 42 is configured to be blown from diagonally ahead against the tire-wheel assembly W, it is possible to faithfully reproduce running conditions on an actual road.

Since it is also possible to blow air against a contact area of the tire-wheel assembly W, it is possible to further efficiently cool the tire-wheel assembly W.

Since the wind direction adjuster 44 includes the position adjustment mechanism 441 and the orientation adjustment mechanism 442, it is possible to further flexibly change the position and/or the orientation of the air outlet 42 by simple operation.

Furthermore, when the position or angle of the air outlet 42 is slightly changed, it is possible to simply change the position and/or the orientation of the air outlet 42 only by individually adjusting the slide member b2 or the turn member 442a without moving the movable base a1.

Since the fan 41 and the air outlet 42 are connected by the blower tube 43, it is possible to freely select the location where the fan 41 is installed.

More specifically, it is not necessary to dispose the fan 41 around the test vehicle V, and the fan 41 may be disposed in, for example, an underground pit, so space is saved.

The present invention is not limited to the above embodiment.

For example, the configuration is not limited to the one in which each cooling device 4 provided for a corresponding one of the rollers 11 of the chassis dynamo device includes the single fan 41. A plurality of cooling devices 4 may share the fan 41, or a single cooling device 4 may include a plurality of fans 41.

The cooling device 4 is not limited to the one including the single blower tube 43. The cooling device 4 may include a plurality of blower tubes 43. Two or more air outlets 42, such as, for example, the air outlet 42 that sends air to the brake pad B1, the air outlet 42 that sends air to the wheel accommodation space W4, and the like, may be provided for the single tire-wheel assembly W.

The diameter and shape of the air outlet 42 may be changed as needed in accordance with the size of the fan 41, a purpose of a test, a part to be cooled, or the like.

The air outlet 42 may be formed at the distal end of the blower tube 43. Alternatively, when there is space for placing the fan 41, the air outlet 42 may be directly formed in a casing of the fan 41 disposed outside the guard fence 24.

The air outlet 42 may be disposed inside the guard fence 24. A chassis dynamo device that does not include the guard fence 24 may be provided.

The position adjustment mechanism 441 and the orientation adjustment mechanism 442 of the wind direction adjuster 44 are not limited to the above-described ones. The position adjustment mechanism 441 may be interposed between the orientation adjustment mechanism 442 and the distal end portion of the blower tube 43 attached to the orientation adjustment mechanism 442.

The position adjustment mechanism 441 is not limited to the one including the first position adjustment mechanism 441a and the second position adjustment mechanism 441b. The position adjustment mechanism 441 may be configured to be capable of adjusting the position of the air outlet 42 in further larger number of steps or may include only the first position adjustment mechanism 441a.

In the above embodiment, the rails b1 are provided for the movable base a1 of the position adjustment mechanism 441, and the slide member b2 slides on the rails b1. Alternatively, the rails b1 may be provided for the slide member b2, and the movable base a1 may slide relative to the slide member b2.

The orientation adjustment mechanism 442 just needs to turn such that the outer periphery or inner periphery of the turn member 442a is in contact with the outer periphery or inner periphery of the support member 442b. The orientation adjustment mechanism 442 may include, for example, a shaft member integrally formed with the slide member b2, and a shaft hole formed in the turn member 442a.

The shaft member and the shaft hole may be formed in any one of the slide member b2 and the turn member 442a.

The vehicle fixing part just needs to include the rails 21, and the poles 22 and the wires 23 may be other vehicle fixing members.

For control over the volume of air, a table may be prepared in advance in accordance with conditions of a test, and the air volume controller 45 may control the volume of air in accordance with the conditions recorded in the table.

Not using the air volume controller 41, a user may manually set the volume of air.

The air volume controller 45 is not limited to the one that controls the number of revolutions of the fan 41 as described above. The air volume controller 45 may control the opening degree of a valve that is provided inside the blower tube 43 and that adjusts the flow rate of air flowing through the blower tube 43 or may control the diameter or the like of the air outlet 42.

Other than the above, without departing from the purport of the present invention, various modifications and a combination of embodiments are applicable.

INDUSTRIAL APPLICABILITY

According to the present invention, it is possible to freely select a part of a test piece to be cooled and a wind direction in accordance with a purpose of a test, and it is also possible to improve cooling efficiency for parts to be cooled as compared to before.

The invention claimed is:

1. A vehicle testing device that tests a test piece that is a vehicle or a part of the vehicle, the vehicle testing device comprising:
   a rotating body on which the test piece is placed;
   a cooling device that sends air from a side of the rotating body toward at least a part of the test piece in order to cool the test piece placed on the rotating body, wherein the cooling device includes an air outlet through which air is sent from the side of the rotating body toward at least a part of the test piece, and a wind direction adjuster that adjusts a position or an orientation of the air outlet; and
   a vehicle fixing part disposed on the side of the rotating body so as to extend in a front-rear direction of the test piece and used to fix the test piece on the rotating body, wherein the wind direction adjuster is fixed to the vehicle fixing part.

2. The vehicle testing device according to claim 1, wherein the wind direction adjuster is configured to be movable in a front-rear direction of the test piece on the side of the rotating body.

3. The vehicle testing device according to claim 1, wherein the wind direction adjuster is fixed to the vehicle fixing part such that the position of the air outlet is movable relative to the test piece along a direction in which the vehicle fixing part extends.

4. The vehicle testing device according to claim 1, wherein the wind direction adjuster adjusts the position or the orientation of the air outlet such that air is sent toward a tire-wheel assembly of the test piece or a wheel accommodation space accommodating the tire-wheel assembly of the test piece.

5. The vehicle testing device according to claim 1, wherein the wind direction adjuster causes the air outlet to be turnable in a front-rear direction of the test piece.

6. The vehicle testing device according to claim 1, further comprising an air volume controller that controls a volume of air sent from the air outlet.

7. The vehicle testing device according to claim 6, wherein the air volume controller controls the volume of air in accordance with a vehicle speed of the test piece, a rotational speed of a tire-wheel assembly of the test piece, or a temperature of the tire-wheel assembly.

8. The vehicle testing device according to claim 6, wherein the air volume controller controls the volume of air in accordance with a deceleration of a vehicle speed of the test piece or a deceleration of a rotational speed of a tire-wheel assembly of the test piece.

9. The vehicle testing device according to claim 8, wherein, when the deceleration is greater than or equal to a predetermined threshold, the air volume controller controls the volume of air such that the volume of air increases.

10. A cooling method for cooling at least a part of a test piece that is a vehicle placed on a rotating body or a part of the vehicle, the cooling method comprising:
    sending air via an air outlet from a side of the rotating body to at least a part of the test piece in order to cool the test piece placed on the rotating body on which the test piece is placed; and
    adjusting a position or an orientation of the air outlet via a wind direction adjuster that is fixed to a vehicle fixing part disposed on the side of the rotating body so as to extend in a front-rear direction of the test piece and used to fix the test piece on the rotating body.

11. A vehicle testing device that tests a test piece that is a vehicle or a part of the vehicle, the vehicle testing device comprising:
    a rotating body on which the test piece is placed; and
    a cooling device that sends air from a side of the rotating body toward at least a part of the test piece in order to cool the test piece placed on the rotating body, wherein the cooling device includes an air outlet through which air is sent from the side of the rotating body toward at least a part of the test piece, and a wind direction adjuster that adjusts a position or an orientation of the air outlet, and wherein the wind direction adjuster causes the air outlet to be turnable in a front-rear direction of the test piece.

* * * * *